Jan. 18, 1955
A. KRELL
2,700,119
CARBON FEED FOR ARC LIGHTS
Filed Aug. 25, 1951
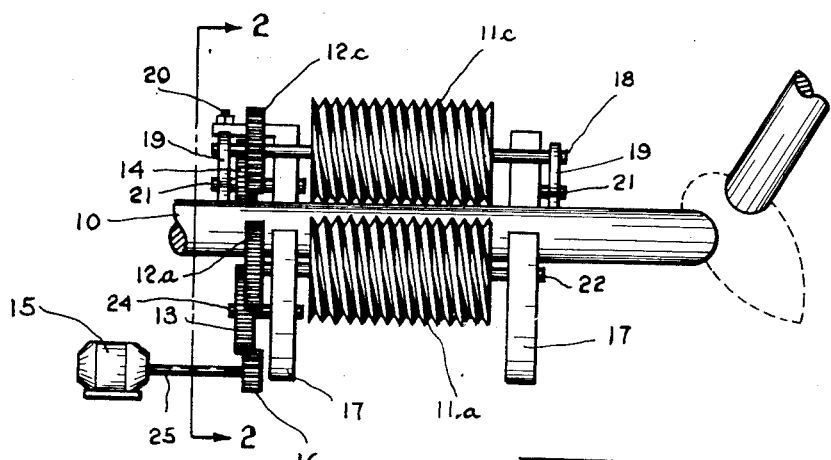
Fig. 1.
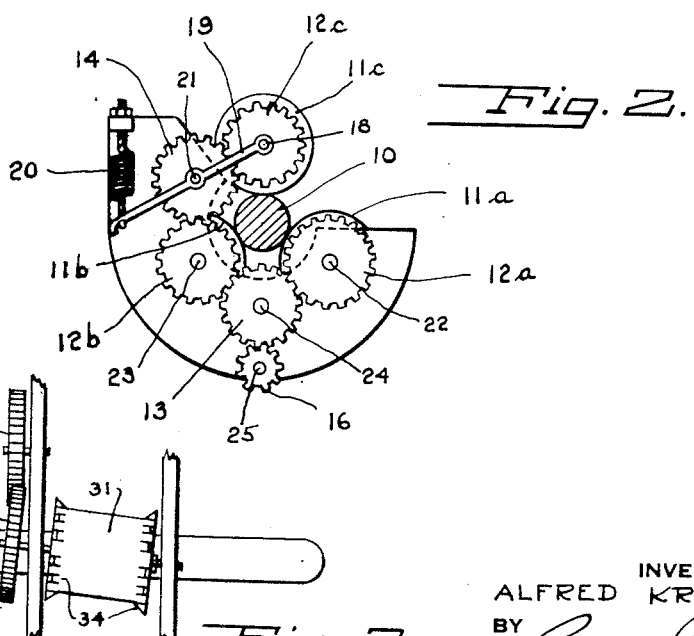
Fig. 2.
Fig. 3.
INVENTOR
ALFRED KRELL
BY
Raymond A. Paquin
ATTORNEY

United States Patent Office 2,700,119
Patented Jan. 18, 1955

2,700,119

CARBON FEED FOR ARC LIGHTS

Alfred Kreil, Brooklyn, N. Y., assignor to American Bosch Arma Corporation, a corporation of New York Application August 25, 1951, Serial No. 243,669

5 Claims. (Cl. 314—69)

The present invention relates to arc lights and has particular reference to novel means for driving the positive carbon toward the arc.

It is conventional practice to feed the positive carbon at a substantially constant rate, simultaneously rotating the carbon to insure even wear of the tip. The method in general use today consists essentially of a serrated wheel to drive the carbon axially, and rotation of the entire gear housing to rotate the carbon.

In the present invention both axial and rotational motion are imparted to the carbon by means of rollers having friction means or threaded portions in the surfaces thereof which are urged against the carbon. The rollers are geared together to rotate in the same direction thereby causing the carbon to rotate, while the carbon is driven axially by virtue of the threads on the rollers. By this arrangement the carbon only is rotated without the necessity of rotating the entire gear housing.

For a more complete understanding of the invention, reference may be had to the accompanying diagrams in which Fig. 1 is a schematic view of the apparatus of this invention;

Fig. 2 is a view along the line 2—2 of Fig. 1, and

Fig. 3 is a view similar to Fig. 1 but showing a modified form of the invention.

Referring now to the Figures 1 and 2 the positive carbon 10 is shown held between three similar rollers 11a, 11b, and 11c, made of some hard material such as steel, for example, on the surfaces of which threads are cut. The rollers 11a, 11b, and 11c are connected to the respective gears 12a, 12b and 12c which are all rotated in the same direction by means of idler gears 13 and 14 which mesh with gears 12a and 12b and with gears 12b and 12c respectively. The idler gear 13 on shaft 24 is driven by shaft 25 from motor 15 which may be of any suitable type at a constant speed by means of the driving pinion 16.

Gears 12a, 12b, 13, and 14 and rollers 11a and 11b are all supported in fixed relation in the frame 17. Gear 12a and roller 11a are supported by shaft 22 and gear 12b and roller 11b are supported by shaft 23. Gear 12c and roller 11c are supported by the shaft 18 which is journalled at both ends in the linkage bars 19. These links 19 are pivoted on shafts 21 about the center of idler gear 14, and the free end of the linkage is urged upward (in Fig. 2) about said pivot connection by the spring 20 which is attached to the frame 17. The ends of links 19 are connected to shaft 18. Thus, roller 11c may be lifted from the carbon 10, by pivoting links 19 about shafts 21 to allow easy replacement of the carbon. When the roller 11c is released, the spring 20 causes roller 11c to be forced against the carbon 10 thereby forcing the carbon 10 against the other rollers 11a and 11b with substantially equal pressures since the rollers 11a, 11b and 11c are equally spaced or otherwise disposed about the periphery of carbon 10.

If desired, driving or pressure rolls may be provided at diametrically opposed points on the carbon and guide rolls positioned at diametrically opposed points between said driving or pressure rolls.

It will be seen that as motor 15 drives the pinion 16 the gears 12a, 12b and 12c are driven in same direction, for example counterclockwise in Fig. 2. The counterclockwise rotation of the rollers 11a, 11b, 11c causes the carbon 10 to be rotated in a clockwise direction. The pressure of the rollers against the carbon 10 temporarily deforms the surface of the carbon so that the threaded surfaces of the rollers 11a, 11b, and 11c cause the carbon 10 to move axially. In Fig. 1, with a right hand thread on the rollers 11a, 11b, 11c, the carbon moves to the right with a counterclockwise rotation (Fig. 2) of the rollers.

The ratio between axial and rotational motion of the carbon 10 is dependent on the pitch of the threads on the rollers; for a rapid feed, the threads are coarse while for a slow feed, fine threads are used.

Figure 3 illustrates an alternative construction in which the threaded rollers 11 are replaced by skewed rollers 31, of which only one is shown in Fig. 3. The angle between the axis of rotation of roller 31 and the longitudinal axis of carbon 10 is greatly exaggerated for the sake of clarity. As roller 31 is rotated in the direction of the arrow by motor 25 through a gear train not shown but terminating in gears 32 and 33, the spurs 34 of roller 31 while rotating the carbon 10 simultaneously cause the carbon to be urged to the right in Fig. 3. Although the rollers 31 are preferably equipped with spurs 34, as shown, any friction surface, such as rubber for example, may be substituted for the spurs 34.

From the above it will be seen that simple, efficient and economical means have been provided for obtaining all of the objects and advantages of the invention.

I claim:

1. In a device of the character described, a plurality of rollers positioned about the periphery of a carbon, said rollers having spurs on the surfaces thereof adjacent the opposed edges thereof only and in engagement with the periphery of said carbon, and means for simultaneously rotating said rollers to simultaneously impart axial and rotational motions to said carbon, a shaft for each of said rollers and a pivotable support for the shaft of one of said rollers.

2. In a device of the character described, supporting means, a plurality of spaced roller means carried by said supporting means, said roller means engaging the periphery of a carbon to impart axial and rotational motions to said carbon upon rotation of said roller means, said roller means having threaded portions in the surface thereof engaging said carbon.

3. In a device of the character described, supporting means, a plurality of spaced roller means carried by said supporting means, a shaft for each of said roller means, said roller means engaging the periphery of a carbon on three sides thereof to impart axial and rotational motions to said carbon upon rotation of said roller means, said roller means having friction means in the surface thereof engaging said carbon, means for effecting simultaneous rotation of said roller means and lever means pivotally connected to the shaft of one of said rollers and carrying the shaft of another of said rollers.

4. In a device of the character described, supporting means, a plurality of spaced roller means carried by said supporting means, said roller means engaging the periphery of a carbon to impart axial and rotational motions to said carbon upon rotation of said roller means, said roller means having friction portions in the surface thereof engaging said carbon, and means for effecting simultaneous rotation of said roller means and lever means pivotally connected to the shaft of one of said rollers and carrying the shaft of another of said rollers and resilient means connected to said lever means.

5. In a device of the character described, supporting means, a plurality of spaced roller means carried by said supporting means, said roller means being spaced about the periphery of and engaging the periphery of a carbon at three points to impart axial and rotational motions to said carbon upon rotation of said roller means, said roller means having threaded portions in the surface thereof adapted to engage said carbon and means for urging said rollers against said carbon.

References Cited in the file of this patent

UNITED STATES PATENTS

| 1,549,200 | Maby | Aug. 11, 1925 |
| 2,125,171 | Peters | July 26, 1938 |